United States Patent
Taguchi et al.

(10) Patent No.: US 8,131,059 B2
(45) Date of Patent: Mar. 6, 2012

(54) DEFECT INSPECTION DEVICE AND DEFECT INSPECTION METHOD FOR INSPECTING WHETHER A PRODUCT HAS DEFECTS

(75) Inventors: Junichi Taguchi, Sagamihara (JP); Takumichi Sutani, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 1071 days.

(21) Appl. No.: 12/068,005

(22) Filed: Jan. 31, 2008

(65) Prior Publication Data

US 2008/0310702 A1 Dec. 18, 2008

(30) Foreign Application Priority Data

Mar. 12, 2007 (JP) .................. 2007-061817

(51) Int. Cl.
*G06K 9/62* (2006.01)

(52) U.S. Cl. ........ 382/149; 382/145; 382/141; 382/151; 382/209

(58) Field of Classification Search .................. 382/100, 382/141–152, 209; 702/34
See application file for complete search history.

(56) References Cited

U.S. PATENT DOCUMENTS 5,586,058 A * 12/1996 Aloni et al. ..................... 702/35

(Continued)

FOREIGN PATENT DOCUMENTS

JP 63-211474 9/1988

(Continued)

OTHER PUBLICATIONS

Vega-Rodriguez et al. "An FPGA Based Implementation for Median Filter Meeting the Real Time Requirements of Automated Visual Inspection Systems" Proc. of the 10th Med. Conference on Control and Automation-MED 2002, Lisbon, Portugal 7-9-12, 2002, pp. 1-7.*

(Continued)

*Primary Examiner* — Jason M Repko
*Assistant Examiner* — Mia M Thomas
(74) *Attorney, Agent, or Firm* — McDermott Will & Emery LLP

(57) ABSTRACT

In an apparatus for photographing an image of a product to judge whether or not a defect is present, a manufacturing desirable image is formed from data acquired when the product was designed, which could be obtained if no defect was present when the product was photographed, an inspection portion where a defect may occur is selected from the formed manufacturing desirable image, a defect pattern is superimposed on the selected inspection portion so as to form a template equipped with the defect pattern. The image of the product is photographed, a template matching operation is carried out as a template having the defect pattern, and judgement is made whether or not a defect is present based upon a matched evaluation value. As a result, the judgement for judging whether or not the defect is present can be directly carried out based upon the evaluation value.

3 Claims, 6 Drawing Sheets

U.S. PATENT DOCUMENTS

| | | | |
|---|---|---|---|
| 5,619,429 A * | 4/1997 | Aloni et al. | 700/279 |
| 5,844,801 A * | 12/1998 | Kodama et al. | 700/110 |
| 6,324,298 B1 * | 11/2001 | O'Dell et al. | 382/149 |
| 6,922,481 B2 * | 7/2005 | Masuda et al. | 382/141 |
| 6,934,028 B2 * | 8/2005 | Ho et al. | 356/430 |
| 7,233,867 B2 * | 6/2007 | Pisupati et al. | 702/64 |
| 7,275,005 B2 * | 9/2007 | Baba et al. | 702/81 |
| 7,545,971 B2 * | 6/2009 | Shakespeare | 382/141 |
| 7,620,503 B2 * | 11/2009 | Hughes et al. | 702/34 |
| 7,668,364 B2 * | 2/2010 | Lizotte et al. | 382/141 |
| 7,676,078 B2 * | 3/2010 | Fukuhara | 382/147 |
| 7,809,181 B2 * | 10/2010 | Yamashita | 382/151 |
| 7,817,844 B2 * | 10/2010 | Kitamura et al. | 382/141 |
| 7,860,296 B2 * | 12/2010 | Kwon et al. | 382/141 |
| 7,953,560 B2 * | 5/2011 | Holecek et al. | 702/35 |
| 8,050,488 B2 * | 11/2011 | Kim et al. | 382/141 |
| 2004/0033424 A1 * | 2/2004 | Talin et al. | 430/5 |
| 2004/0146202 A1 * | 7/2004 | Hyoki | 382/209 |
| 2004/0247171 A1 * | 12/2004 | Hashimoto et al. | 382/141 |
| 2006/0110025 A1 * | 5/2006 | Ho et al. | 382/144 |
| 2006/0182333 A1 * | 8/2006 | Akimoto | 382/145 |
| 2006/0182334 A1 * | 8/2006 | Akimoto | 382/145 |
| 2006/0222968 A1 * | 10/2006 | Talin et al. | 430/5 |
| 2007/0010954 A1 * | 1/2007 | Steele et al. | 702/35 |
| 2007/0048625 A1 * | 3/2007 | Nordquist et al. | 430/5 |
| 2008/0082283 A1 * | 4/2008 | Dixon et al. | 702/108 |
| 2008/0162066 A1 * | 7/2008 | Steele et al. | 702/84 |
| 2009/0028417 A1 * | 1/2009 | Floeder et al. | 382/141 |
| 2009/0304262 A1 * | 12/2009 | Harabe | 382/152 |

FOREIGN PATENT DOCUMENTS

| | | |
|---|---|---|
| JP | 8-181053 | 7/1996 |
| JP | 2001-351102 | 12/2001 |

OTHER PUBLICATIONS

Yoda et al. "An Automatic Wafer Inspection System Using Pipelined Image Processcing Techniques" IEEE Transactions on Pattern Analysis and Machine Intelligence, Vo. 10, No. 1, Jan. 1998 pp. 1-13.*

Amano "Correlation Based Image Defect Detection" IEEE ICPR (2006) pp. 163-166.*

* cited by examiner

DEFECT INSPECTION DEVICE AND DEFECT INSPECTION METHOD FOR INSPECTING WHETHER A PRODUCT HAS DEFECTS

CLAIM OF PRIORITY

The present application claims priority from Japanese application serial No. 2007-061817 filed on Mar. 12, 2007, the content of which is hereby incorporated by reference into this application.

BACKGROUND OF THE INVENTION

1. Field of the Invention

The present invention is related to a defect inspection apparatus and a defect inspection method. More specifically, the present invention is directed to a defect inspection apparatus and a defect inspection method, for inspecting whether or not a manufactured product has been manufactured with a desirable shape and without any defect within a predicted range of a design work.

2. Description of the Related Art

As technical ideas capable of comparing/judging whether or not images obtained by photographing subjects to be inspected have desirable shapes in order to inspect defects, such techniques called as "template matching techniques" have been widely utilized. Then, generally speaking, defect inspections are carried out in accordance with the following sequential operations: That is, in such a case that a position where a defect may readily occur has been previously grasped due to reasons on manufacturing aspects and the like, an inspection position is found out by utilizing a so-called "template matching technique", and thereafter, an inspection whether or not the defect is actually present at the position where the defect may easily occur is carried out in a precise manner.

As the conventional techniques related to the above-described template matching operations, such a technical idea is known which has been described in, for instance, a publication entitled "Basic and Application Ideas of Digital Image Processing Operation based upon Visual C#. NET & Visual Basic. NET-from Basic Concept up to Face Image Recognition-" written by Koich SAKAI, published by CQ publisher, first edition published on Sep. 1, 2003" and so on. The basic method as to the template matching technique has been described in this publication entitled "Basic and Application Ideas of Digital Image Processing Operation based upon Visual C#. NET & Visual Basic. NET-from Basic Concept up to Face Image Recognition" written by Koich SAKAI, published by CQ publisher, first edition published on Sep. 1, 2003", in the third column of the fifth section, on pages 84 to 86. FIG. 5 and FIG. 6 of the above-described publication have exemplified such a correlative calculation result that (a) a face image of a girl is employed as an original image; (b) a left eye portion is cut out as a template; and while such an image formed by converting concentration of the original image is employed as an input image, a correlative calculation with respect to the template is carried out at each portion of the input image. Then, this publication has exemplified that (c) when a threshold value of a correlation coefficient is selected to be larger than, or equal to 0.99, only the position of the left eye cut out as the template is matched; and, however, when a threshold value of a correlation function is selected to be 0.8, a certain number of matching candidate positions may appear not only in the left eye, but also in the right eye.

Also, technical ideas capable of reducing calculation times of matching operations have been described in JP-A-63-211474, JP-A-2001-351102, and the publication entitled "Basic and Application Ideas of Digital Image Processing Operation based upon Visual C#. NET & Visual Basic. NET-from Basic Concept up to Face Image Recognition" written by Koich SAKAI, published by CQ publisher, first edition published on Sep. 1, 2003", respectively. The matching calculation time reducing technique described in JP-A-63-211474 is given as follows: That is, the dimension of the image of the template, the sampling rate, and the candidate point area are decreased in the hierarchical manner. As a result, the matching calculation can be carried out in a higher speed, as compared with such a case that the template having the large size which has not yet been processed in the hierarchical manner is held. Then, another matching calculation reducing technique has been described in the publication entitled "Basic and Application Ideas of Digital Image Processing Operation based upon Visual C#. NET & Visual Basic. NET-from Basic Concept up to Face Image Recognition" written by Koich SAKAI, published by CQ publisher, first edition published on Sep. 1, 2003." That is, in such a case that the binary image is employed, when the subtraction based upon the averaged value and the normalization can be omitted, "distance" is employed as the evaluation formula so as to shorten the calculation time, so that the process operation can be carried out in the high speed. Also, JP-A-2001-351102 has described such a method for performing the matching calculation of the binary image in the high speed. That is, in the case that the subject to be recognized is a relatively simple mode, while the circle is employed as the template, in which the width of the externally contacted rectangle for constituting the subject to be recognized is defined as the diameter, the matching calculation as to the binary image can be performed in the high speed.

Furthermore, JP-A-8-181053 has disclosed such a method capable of suppressing an erroneous recognition for positioning operation, which is suitable for an exposing apparatus which forms a large-sized liquid crystal display element. In this suppressing technique described in JP-A-8-181053, such a portion that a large number of errors may occur is masked which has been previously grasped within a template image; a candidate position is masked which also corresponds to a photographed image (input image); a calculation is carried out based upon a predetermined evaluation formula only as to such an area which is not masked, so that the position detecting precision can be improved.

SUMMARY OF THE INVENTION

In the defect inspection method by the conventional technique, after the positions where the defects may easily occur have been previously found out by performing the template matching technique, since the precision inspections are again carried out, the sequential steps of the inspections are increased. As a result, the conventional defect inspection method has such an problem that a lengthy time is necessarily required.

An object of the present invention is to solve the above-described problem of the conventional technique, and is to provide a defect inspection apparatus and a defect inspection method, capable of judging whether or not a subject to be inspected (corresponding to manufactured article) has a defect in a high speed, while such a cumbersome operation that a precise inspection is again carried out can be omitted.

In accordance with the present invention, the above-described objet can be achieved by such a defect inspection apparatus for inspecting whether or not a product could be correctly manufactured, comprising: a manufacturing desirable image forming circuit for forming a manufacturing desirable image from an original image of the manufacturing desirable image derived from a designing work; an inspection portion setting circuit for setting a portion where a defect may readily occur within the manufacturing desirable image; a partial image having defect pattern forming circuit for superimposing a defect pattern where the defect may readily occur on a partial image made by cutting out the inspection portion of the manufacturing desirable image so as to form a partial image equipped with the defect pattern; a photographing circuit for photographing the manufactured product as an inspection subject; a template matching circuit by which while an image of the inspection subject photographed by the photographing circuit is employed as an input image and the partial image having the defect pattern is employed as a template, the input image is compared with the template; and a defect present/absent judging circuit for judging whether or not the defect is present based upon an evaluation value outputted from the template matching circuit.

Also, the above-described object can be achieved by such a defect inspection apparatus for inspecting whether or not a product could be correctly manufactured, comprising: a photographing circuit for photographing a sample of the product so as to form a sample image; an inspection portion setting circuit for setting a portion where a defect may readily occur within the sample image; a partial image having defect pattern forming circuit for superimposing a defect pattern where the defect may readily occur on a partial image made by cutting out the inspection portion of the sample image so as to form a partial image equipped with the defect pattern; a photographing circuit for photographing the manufactured product as an inspection subject; a template matching circuit by which while an image of the inspection subject photographed by the photographing circuit is employed as an input image and the partial image having the defect pattern is employed as a template, the input image is compared with the template; and a defect present/absent judging circuit for judging whether or not the defect is present based upon an evaluation value outputted from the template matching circuit.

In accordance with the present invention, the cumbersome operation for again precisely inspecting whether or not the defect is present in the image acquired by photographing the subject to be inspected can be omitted. As a result, the inspection time can be reduced by such a time required for performing the above-described cumbersome operation.

Other objects, features and advantages of the invention will become apparent from the following description of the embodiments of the invention taken in conjunction with the accompanying drawings.

DETAILED DESCRIPTION OF THE INVENTION

The present invention is featured in an image processing operation which is executed by a defect inspection apparatus in order to inspect a defect, while various sorts of embodiment modes thereof may be realized. For instance, as one embodiment mode of the present invention, exclusively-used hardware capable of executing the image processing operation of the present invention may be constructed. Also, as another embodiment mode, software in which an image processing process of the present invention has been described may be formed, and the software may be executed by a general-purpose computer.

In the case that the general-purpose computer is employed, the software may be stored in a storage medium and the storage medium may be provided. Since the software may be executed without specifying a computer, the storage medium which has stored thereinto the software constitutes an important universal element used so as to execute the entire inventive idea of the present invention, while this universal element corresponds to one embodiment mode of the present invention, which constitutes an arbitrary component in an installed destination. As storage media for storing thereinto the software, there are CDs, DVDs, memory cards, HDs, external apparatuses capable of being connected to the Internet and capable of downloading the software.

As general-purpose computers, for example, "FLORA" series computers manufactured by Hitachi Co., Ltd, "VAIO" series computers manufactured by SONY, "MEBIUS" series computers manufactured by SHARP corporation, and the like may be employed, while these computers are commercially available. As OSs (operating systems), "Windows (registered trademark)" manufactured by Microsoft Corporation, "Linux" of the public domain available by everyone, and the like may be employed. In the case that the software is formed, as tools for supporting forming works, "C++ Builder" marketed by Borland corporation, "Visual C++" marketed by Microsoft Corporation, and the like may be employed, while these tools are commercially available. As a consequence, software in combination with GUI (graphic user interface) may be easily developed.

Various embodiments as to a defect inspection apparatus and a defect inspection method, according to the present invention, will now be described in detail with reference to drawings.

Figure 2A:
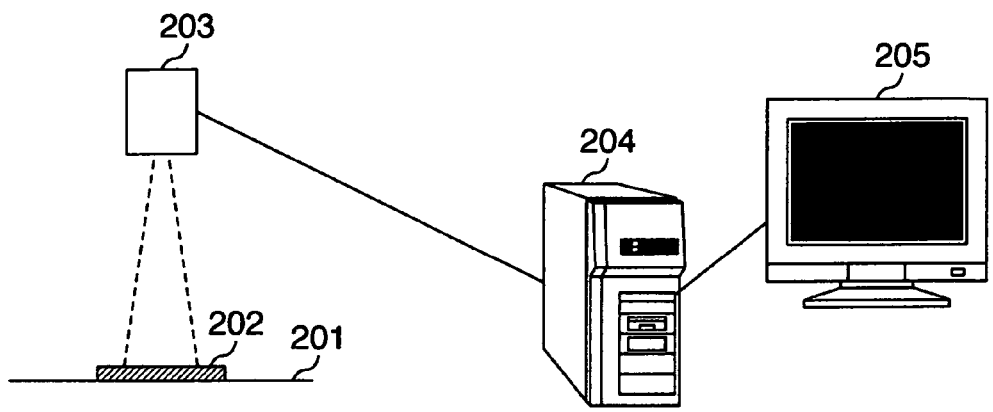
FIG. 2A and FIG. 2B are block diagrams for representing an entire system structure of a defect inspection apparatus and an arrangement of a computing apparatus thereof, according to a first embodiment of the present invention.
Figure 2B:
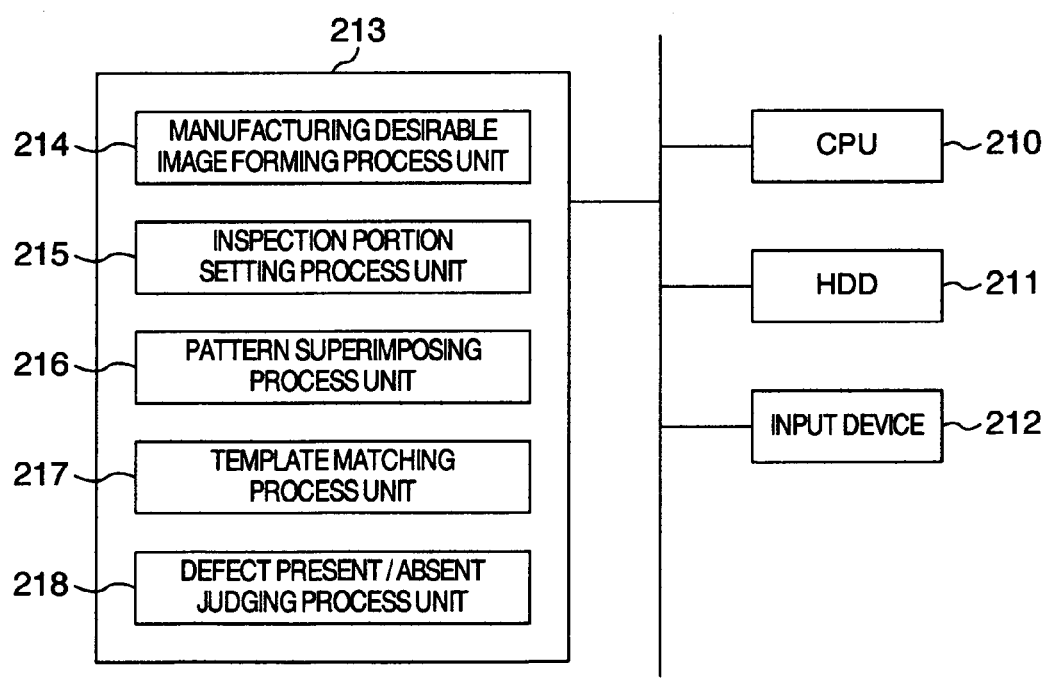

FIG. 2A and FIG. 2B are block diagrams for representing an entire system structure of a defect inspection apparatus and an arrangement of a computing apparatus thereof, according to a first embodiment of the present invention.

As indicated in FIG. 2A, the defect inspection apparatus is arranged as a system thereof by employing a stage 201 for mounting thereon an inspection subject 202, a photographing apparatus 203, a computing apparatus 204, and a display apparatus 205. The stage 201 is such an article which mounts thereon the inspection subject 202 and transports the inspection subject 202 to a photographing field of the photographing apparatus 203. The photographing apparatus 203 photographs the inspection subject 202, and then, transmits a photographed image to the computing apparatus 204. In order to control the above-described operations, the computing apparatus 204 transmits control signals for driving the stage 201 and the photographing apparatus 203 to the stage 201 and the photographing apparatus 203. Also, the computing apparatus 204 performs an image processing operation with respect to the image photographed by the photographing apparatus 203, and displays the result of the image processing operation on the display apparatus 205. It should be understood that the inspection subject 203 is not limited only to one inspection subject, but the stage 201 is controlled in such a manner that while the stage 201 mounts thereon a plurality of inspection subject groups, the stage 201 sequentially transports the inspection subject 202 to the photographing field of the photographing apparatus 203.

Also, the computing apparatus 204 may acquire information such as manufacturing desirable images when an inspection subject was designed from a storage medium, for example, a CD, or via the Internet line from an external source. Conversely, the computing apparatus 204 may transfer a processed result calculated by the computing apparatus 204 to the external source.

The present invention is related to a method for processing an image by the computing apparatus 204. In particular, the present invention is featured by a processing method for performing a template matching process operation within the image processing operations. Concretely speaking, the present invention has such a feature that while a process operation for treating a template is provided, it is possible to judge whether or not a defect is present based upon a numeral value.

The computing apparatus 204 may be arranged by employing a computing apparatus having a well-known arrangement, otherwise, as represented in FIG. 2B, may be alternatively arranged by employing a CPU 210, a storage apparatus 211 made of a hard disk drive (HDD), an input device 212 such as a keyboard and a mouse, and a main memory 213. Then, a manufacturing desirable image forming process unit 214, an inspection portion setting process unit 215, a pattern superimposing process unit 216, a template matching process unit 217, and a defect present/absent judging process unit 218 are stored in the main memory 213, which are constructed by software for performing respective process operations (will be described later with reference to FIG. 3).

Figure 3:
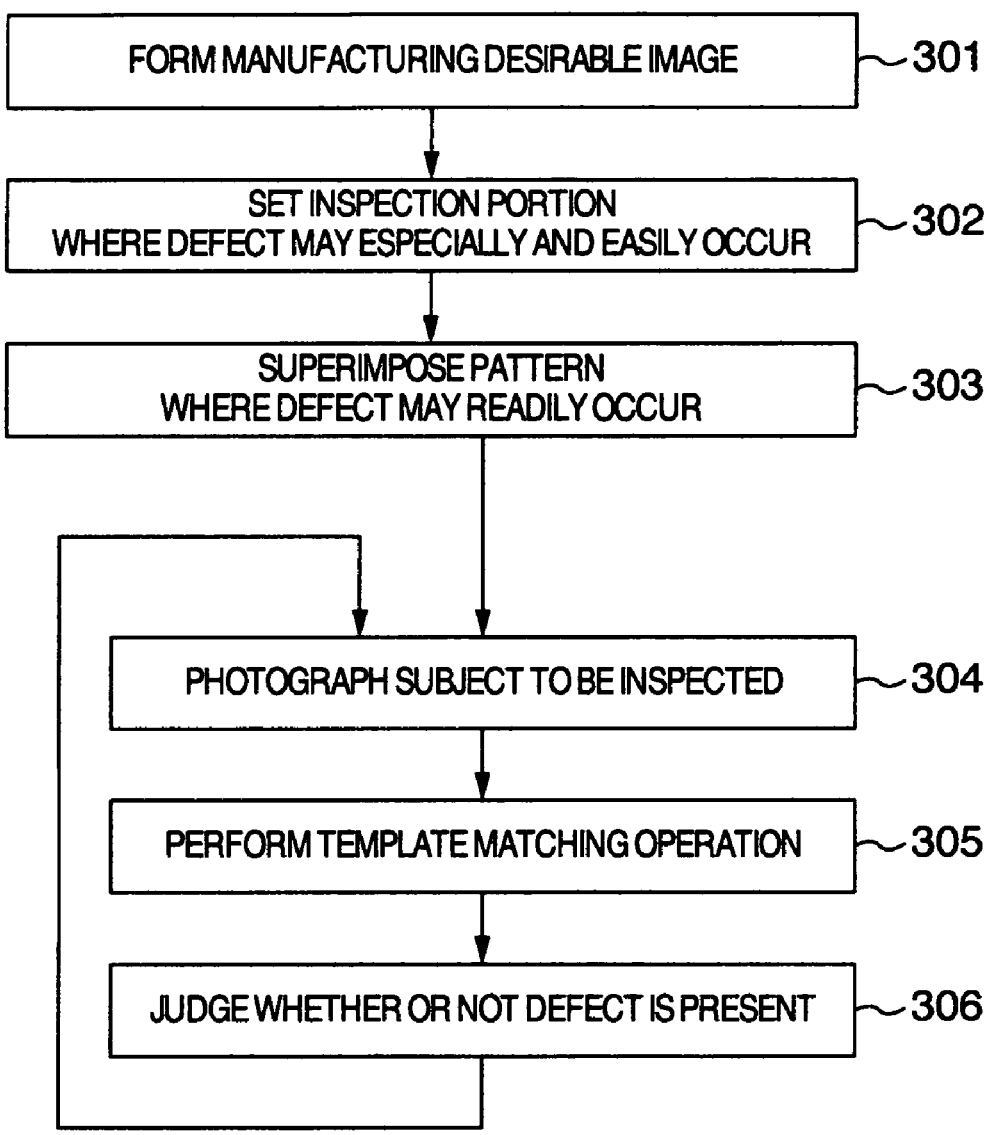
FIG. 3 is a flow chart for describing an entire processing operation of the defect inspection apparatus according to the first embodiment of the present invention.

FIG. 3 is a flow chart for describing an entire process operation of the defect inspection apparatus according to the first embodiment of the present invention. Next, a description is made of this entire process operation.

(1) Firstly, the computing apparatus 204 acquires an original image of a manufacturing desirable image 101 (example thereof will be explained later) formed when a manufacture of an inspection subject 202 was designed via either a CD or the Internet line from an external source. Then, the computing apparatus 204 executes such geometrical transformations as an enlargement, a compression, and a rotation with respect to the original image of the acquired manufacturing desirable image 101 in such a manner that a size of the original image becomes equal to the size thereof when the inspection subject 202 was photographed so as to produce the manufacturing desirable image 101 from information such as magnifying power when the inspection subject 202 was photographed (step 301).

(2) The computing apparatus 204 displays the manufacturing desirable image 101 on the display apparatus 205 in order to cause an operator to set an inspection portion 102 (example thereof will be described later) (step 302). In the inspection portion 102, a defect especially and easily may occur due to a problem of a manufacturing process.

(3) The computing apparatus 204 displays the inspection portion 102 where the defect may easily occur on the display unit 205, which was selected by the operator in the process operation of the step 302. The computing apparatus 204 causes the operator to operate a defect pattern 103 where a defect may readily occur (example thereof will be discussed later) on a display screen so as to superimpose the defect pattern 103 on the inspection portion 102, and causes the operator to form a template 104 equipped with the defect pattern 103 (example thereof will be explained later). It should be understood that this formed template is utilized as such a template of a template matching process operation which will be executed in a process operation of a step 305.

It should also be noted that the above-described operation executed in the steps 302 and 303 in which the operator operates the display screen so as to designate the specific place and to superimpose the desirable pattern corresponding to a so-called "GUI (Graphic User Interface)", and therefore, may be executed by employing commercially available GUI software forming support tools (for instance, "C++ Builder" marketed by Borland corporation, "Visual C++" marketed by Microsoft corporation etc.) (step 303).

(4) Next, an inspection subject 202 whose inspection is desired is mounted on the stage 201, and is moved in order that the inspection subject 202 is entered into the photographing field of the photographing apparatus 203. The photographing apparatus 203 photographs a photographing subject and transmits the photographed image thereof to the computing apparatus 204. The image obtained by photographing this inspection subject 202 has contained the same portion as the inspection portion 102 set in the step 302 (step 304).

(5) The computing apparatus 204 performs a template matching operation between the template 104 equipped with the defect pattern produced in the process operation of the step 303 an the range photographed in the process operation of the step 304 so as to acquire an evaluation value of each of portions. A template matching operation implies such a process operation that a template and partial images of respective portions of a photographed image are calculated based upon a predetermined evaluation formula so as to evaluate resemblance degrees of the respective portion. As a result, an evaluation value produced by evaluating a resemblance degree in a partial image of each of the portions of the photographed image of the inspection subject is obtained every portion. There are many possibilities that such an entire process operation including the above-described process operations and thereafter another process operation for outputting a place having a high evaluation value is called as the template matching operation. However, in this embodiment, such an entire process operation until the process operation for acquiring the evaluation values produced by evaluating the resemblance degrees of the respective portions is referred to as the template matching operation. As concrete methods, for example, such a method may be employed, which is described in the publication entitled "Basic and Application Ideas of Digital Image Processing Operation based upon Visual C#. NET & Visual Basic. NET-from Basic Concept up to Face Image Recognition" written by Koich SAKAI, published by CQ publisher, first edition published on Sep. 1, 2003." Also, as to matching evaluation formulae, resemblance degrees may be evaluated based upon various sorts of evaluation formulae such as "sum of products", "square of difference", and "sum of squares as to difference from average" in addition to a method with employment of "correlation" which has been described in the publication entitled "Basic and Application Ideas of Digital Image Processing Operation based upon Visual C#. NET & Visual Basic. NET-from Basic Concept up to Face Image Recognition" written by Koich SAKAI, published by CQ publisher, first edition published on Sep. 1, 2003." As to the evaluation formulae, a proper evaluation formula may be selected, depending upon a nature of an image of an inspection subject to be photographed, and the nature of the template formed in the above-described process operation of the step 303. A concrete example as to the evaluation formula for the matching operation will be described later (step 305).

(6) Next, the computing apparatus 204 judges whether or not a defect is present based upon the evaluation as to each of the portions acquired in the above-described template matching process operation in the step 305. In such a case that the evaluation formula of the matching operation is selected to be either "correlation" or "sum of products", the computing apparatus 204 selects the highest evaluation value from the evaluation values of the respective portions, and this highest evaluation value is regarded as the value for evaluating the inspection portion 102. When this evaluated value is larger than a predetermined value, the computing apparatus 204 judges that the defect is present and displays such a message that the defect is present on the display apparatus 205. When this evaluated value is smaller than the predetermined value, the computing apparatus 204 judges that the defect is not present and displays such a message that the defect is not present on the display apparatus 205. Also, in such a case that the evaluation formula of the template matching operation is selected to be either "square of difference" or "sum of squares as to difference from average", the computing apparatus 204 regards such a value of a portion whose evaluation value is minimum as the value for evaluating the inspection portion 102. When this evaluated value is smaller than a predetermined value, the computing apparatus 204 judges that the defect is present, whereas when this evaluated value is larger than the predetermined value, the computing apparatus 204 judges that the defect is not present (step 306).

(7) If the process operation for judging whether or not the defect is present as to the photographed image of one inspection subject 202 is accomplished in the process operation of the step 306, then the computing apparatus 204 feeds the inspection subject 202 whose photographing and inspecting operations have been accomplished outside the photographing field of the photographing apparatus 203, and controls the stage 201 in such a manner that another inspection subject 202 is entered into the photographing field, and then, is returned to the process operations from the step 304, so that the computing apparatus 204 sequentially executes product inspections with respect to a series of the same products.

Figure 1:
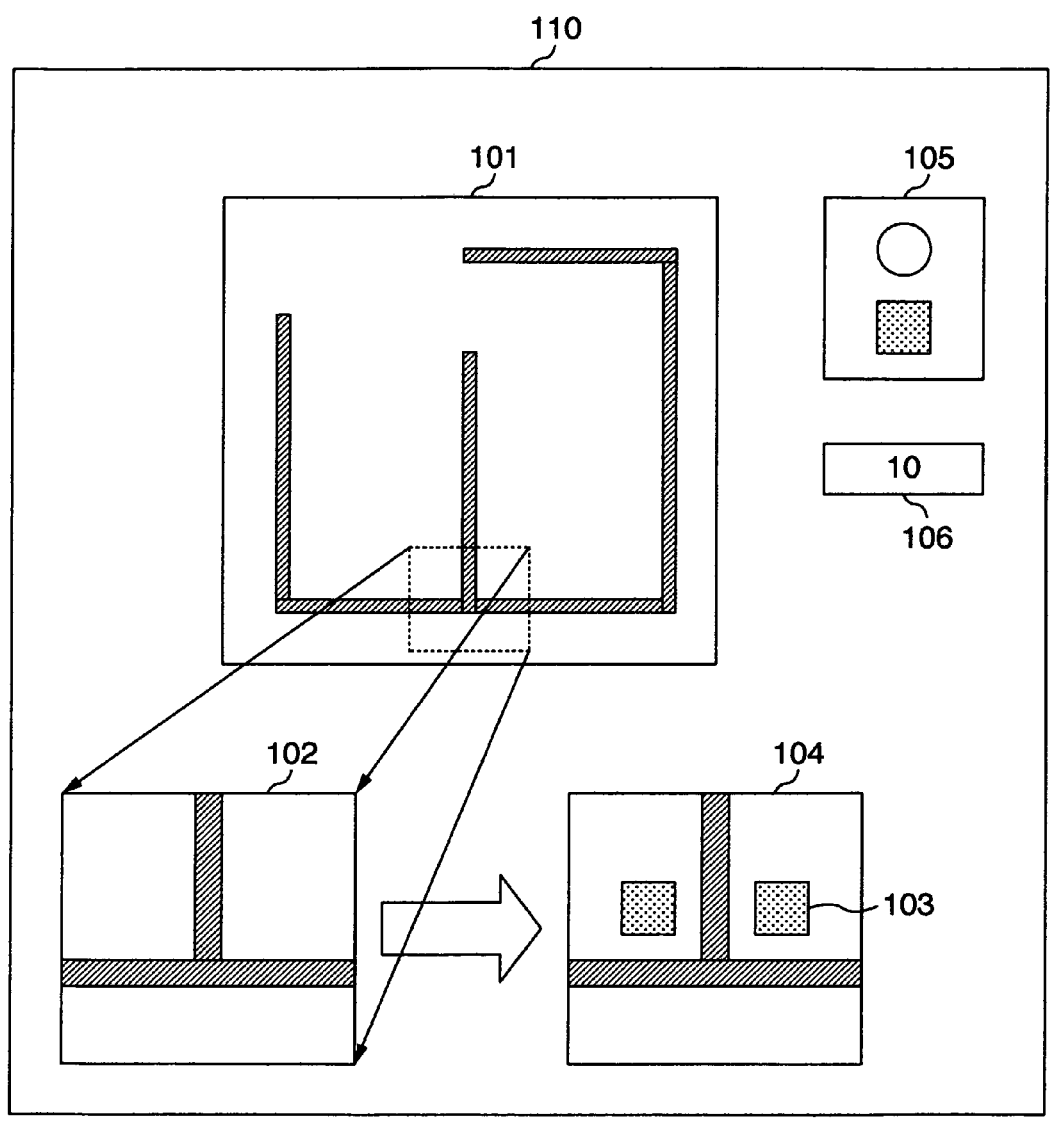
FIG. 1 is a diagram for illustratively showing a display screen example displayed when an operator operates a screen by employing a GUI while the operator views images displayed on the display screen, according to the present invention.

FIG. 1 is a diagram for indicating an example as to a display screen 110 which is displayed when the operator operates the screen by employing the GUI (graphic user interface) while the operator views images displayed on the display screen 110 of the display apparatus 205 in the above-described process operations defined in the step 302 and the step 303. Referring now to the step numbers shown in FIG. 3 and the images of FIG. 1, a description is made of an operation flow by the operator and the example of the display screen 110.

When the process operation defined in the step 302 is commenced, the manufacturing desirable image 101 has been displayed at an upper portion of the display screen 110. The operator mouse-picks such an inspection portion 102 that a defect may especially and readily occur due to a problem in manufacturing process so as to designate the inspection portion 102, while the operator views this image 101. The computing apparatus 204 receives information of an image position designated by the mouse operated by the operator, and displays the desirable partial image picked by the operator at a lower left portion of the display screen 110 as the inspection portion 102 where the defect may readily occur.

In the process operation defined in the step 303, the operator mouse-picks a position of an image contained in the inspection portion 102 where the defect may easily occur, which is displayed at the lower left portion of the display screen 110, so as to designate a position of a defect pattern 103 to be superimposed. The computing apparatus 204 superimposes the defect pattern 103 as a default at this designated position based upon the information about the position operated by the operator, and thus, displays a template 104 equipped with the defect pattern 103 on a lower right portion of the display screen 110. Thereafter, the operator selects a shape and a dimension of the defect pattern 103.

In other words, the operator selects the shape of the defect pattern 103 by mouse-picking a plurality of defect patterns which have been stored in a shape setting panel 105 displayed on an upper right portion of the display screen 110. Then, since the operator inputs a numeral in a numeral value inputting box 106, such a defect pattern 103 having the designated shape and the designated dimension is superimposed within the image of the inspection portion 102 in order to form the template 104 equipped with the defect pattern 103. Also, a correction of a position of the defect pattern 103 can be carried out by such a manner that the defect pattern 103 within the template 104 displayed on the lower right portion of the display screen 110 is picked and moved by manipulating the mouse. Thus, the template 104 equipped with the defect pattern 103 is formed in accordance with the above-described operations, and then, this template 104 is utilized in the matching operation.

In the above description, the operation flow when the operator performs the process operations via the GUI (graphic user interface) based upon the display screen 110 has been explained. Alternatively, both an engineer who forms a GUI and a person having similar technical skill may form a computer program from the above-explained operation flow by employing a commercially available GUI software forming support tool (for instance, "C++ Builder" marketed by Borland corporation, and "Visual C++" marketed by Microsoft Corporation etc.), and since this formed computer program is installed in the computing apparatus 204, it is possible to construct such an apparatus capable of performing the above-explained flow operations.

Figure 4:
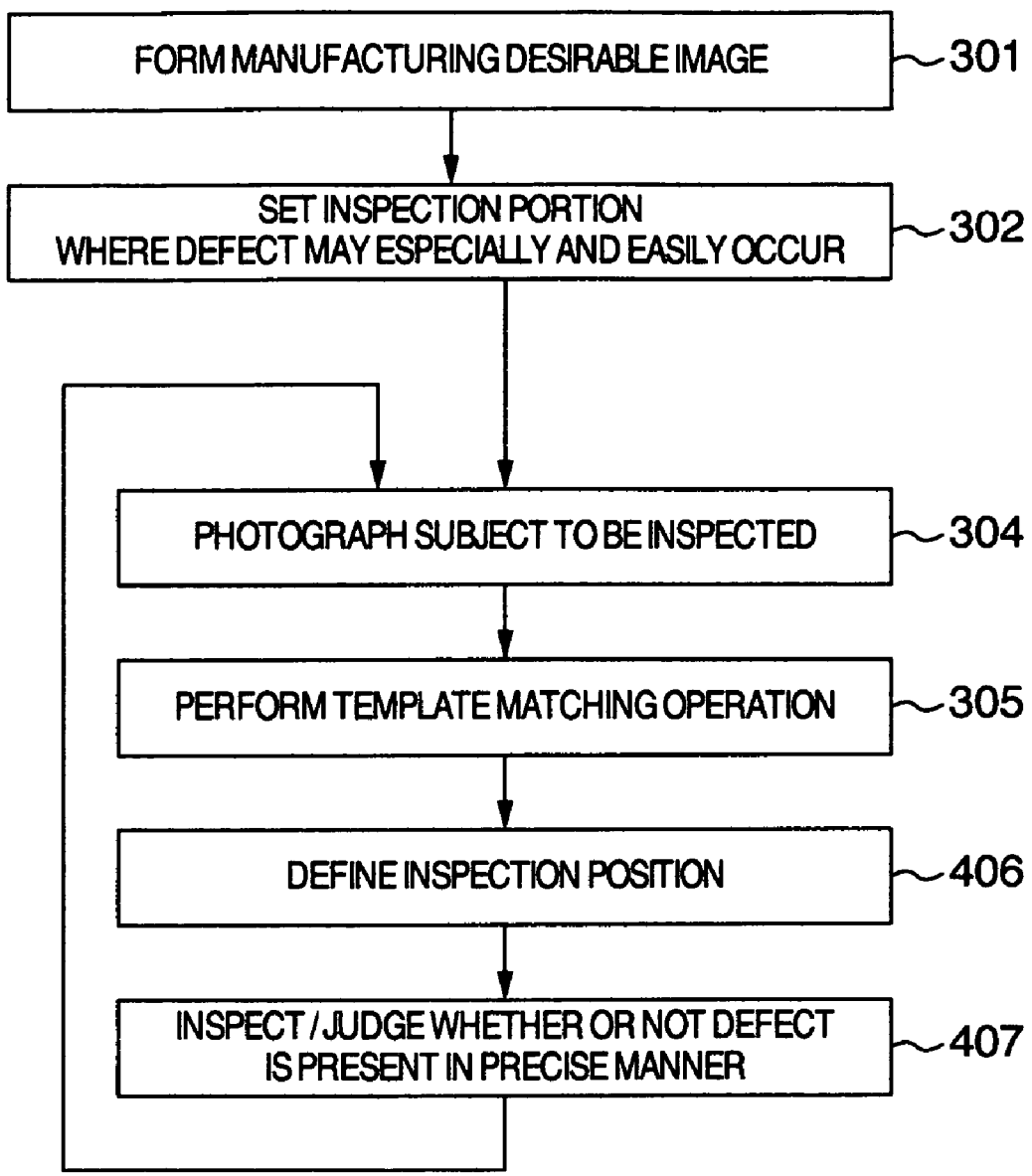
FIG. 4 is a flow chart for explaining an entire processing operation of a generally-conceivable defect inspection apparatus.

FIG. 4 is a flow chart for explaining an entire process operation of a defect inspection apparatus accomplished based upon a generally conceivable technical idea. In this case, in order to be compared with the above-described entire process operation of the defect inspection apparatus according to the first embodiment of the present invention with reference to FIG. 3, the process operations of the generally-conceivable defect inspection apparatus will now be described.

When the process sequence of the first embodiment described with reference to FIG. 3 is compared with a process sequence of the generally-conceivable technical idea indicated in FIG. 4, this process sequence of the generally-conceivable technical idea has the following different points from those of the first embodiment: That is, the step 303 for superimposing the pattern where the defect may readily occur according to the present invention is not provided; the step 306 for judging whether or not the defect is present cannot be immediately carried out; and after a process operation of a step 406 for defining an inspection position is carried out, the process operation of the generally-conceivable technical idea is advanced to a process operation of a step 407 for precisely inspecting and judging a defect.

From the flow chart shown in FIG. 4, a feature of the first embodiment of the present invention may be understood. That is, since the process operation of the step 303 is provided, the process operations defined in the steps 406 and 407 in the generally-conceivable technical idea are no longer performed, and thus, the process operation of the step 303 for judging whether or not the defect is present can be carried out.

It should also be noted that the process operation of the step 303 in the first embodiment of the present invention corresponds to such a process operation which is performed only 1 time during inspections for a series of the same products, whereas the process operations of the steps 406 and 407 in the generally-conceivable technical idea correspond to the process operations which are performed every time a series of the same products are inspected. In other words, in accordance with the first embodiment of the present invention, the process operations of the steps 406 and 407 which should be carried out every time in the inspection for the series of same products in the generally-conceivable technical idea can be simplified as the process operation of the step 306, so that the entire process time can be shortened.

It should also be noted that the same step numbers of the process flow explained in the first embodiment of the present invention shown in FIG. 3 have been employed as those for denoting the same process steps of the process flow of the generally-conceivable technical idea shown in FIG. 4. Then, although the process operation of the step 302 shown in FIG. 4 is identical to the process operation of the step 302 shown in FIG. 3, the inspection portion 102 where the defect may especially and easily occur, which has been set in this process operation of the step 302, is directly utilized as the template in the process operation of the step 305. Also, in the template matching process of the step 305 indicated in FIG. 4, although the inspection portion 102 where the defect may especially and easily occur, which has been set in this process operation of the step 302, is utilized as the template, the content of the process operation is completely identical to that defined in the step 305 of FIG. 3.

A process operation defined in a step 406 of FIG. 4 corresponds to such a process operation that the computing apparatus 204 defines a portion whose evaluation value is the highest evaluation value among the respective portions as a portion having the inspection portion 102 based upon evaluation values of the respective portions acquired by performing the template matching operation in the process operation of the step 305. Also, a process operation of a step 407 shown in FIG. 4 corresponds to such a process operation that the computing apparatus 204 precisely inspects whether or not a defect is present based upon a predetermined inspection process operation with respect to the inspection portion 102 determined in the process operation of the step 406 so as to judge whether or not the defect is present. The precise inspection processing operation is executed as follows: That is, the computing apparatus 204 calculates a total value of pixel values existing in a defect pattern portion of a portion where the defect may readily occur; when the total pixel value is larger than a predetermined value, the computing apparatus 204 judges that the defect is present; and when the total pixel value is smaller than the predetermined value, the computing apparatus 204 judges that the defect is not present.

Thereafter, similar to the above-described processing operations of the first embodiment of the present invention explained with reference to FIG. 3, the computing apparatus 204 feeds the inspection subject 202 whose photographing and inspecting operations have been accomplished outside the photographing field of the photographing apparatus 203, and controls the stage 201 in such a manner that another inspection subject 202 is entered into the photographing field, and then, is returned to the process operations from the step 304, so that the computing apparatus 204 sequentially executes product inspections with respect to a series of the same products.

While the entire process sequences with respect to the first embodiment of the present invention and the generally-conceivable technical idea shown in FIG. 4 have been so far described, a feature of the present invention is to provided with, especially, the process step 303 for superimposing the pattern where the defect may readily occur. As a consequence, in accordance with the present invention, in the process operation of the step 306 for judging whether or not the defect is present, while the result of the template matching process operation 305 is directly utilized, it is possible to judge whether or not the defect is present.

Next, a detailed description is made of four concrete examples as to the evaluation formula based upon an equation (1) to an equation (4), which is performed in the above-described template matching process operation in the step 305 of FIG. 3 according to the first embodiment of the present invention.

$$\mathrm{val}=(\Sigma(T(i,j)-ht)*(G(i,j)-hg))/(|T-ht|\cdot|G-hg|) \quad (1)$$

The equation (1) is an evaluation formula based upon a "correlation." In this equation (1), symbol "val" implies an evaluation value to be acquired;

symbol "T(i,j)" implies a luminance value of a pixel located at an "i" row and a "j" column of a template;

symbol "(Gi,j)" implies a luminance value of a pixel located at an "i" row and a "j" column of a partial image when the partial image having the same size as the template of interest is cut out from an image produced by photographing an inspection subject;

symbol "ht" implies an averaged luminance value of the template, namely, ht=ΣT(i,j)/(Nx·Ny);

symbol "hg" implies an averaged luminance value of a partial image of interest, namely, hg=ΣG(i,j)/(Nx·Ny);

symbol "Nx" implies a row size of the template;

symbol "Ny" implies a column size of the template;

symbol "|T−ht|" implies a magnitude of a difference from averaged luminance of the entire template, namely, |T−ht|=sqrt(Σ(T(i,j)−ht)*(T(i,j)−ht);

symbol |G−hg| implies a magnitude of a difference from averaged luminance of the entire partial image, namely, |G−hg|=sqrt(Σ(G(i,j)−hg)*(G(i,j)−hg);

symbol "sqrt" implies a root; and also, symbol "Σ" implies a summation of all of combinations with respect to an "i" row and a "j" column.

$$\mathrm{val}=\Sigma T(i,j)*G(i,j) \quad (2)$$

The equation (2) is an evaluation formula based upon "sum of products", and is "distance" in the above-described publication entitled "Basic and Application Ideas of Digital Image Processing Operation based upon Visual C#. NET & Visual Basic. NET-from Basic Concept up to Face Image Recognition" written by Koich SAKAI, published by CQ publisher, first edition published on Sep. 1, 2003." Meanings of the respective terms in the above-described equation (2) are identical to those of the equation (1).

$$\mathrm{val}=\Sigma(T(i,j)-G(i,j))*(T(i,j)-G(i,j)) \quad (3)$$

The equation (3) is an evaluation formula based upon "sum of squares as to difference." Meanings of the respective terms in the above-described equation (3) are identical to those of the equation (1).

$$\mathrm{val}=\Sigma(T(i,j)-ht-G(i,j)+gt)*(T(i,j)-ht-G(i,j)+gt) \quad (4)$$

The equation (4) is an evaluation formula based upon "sum of squares as to difference from average." Meanings of the respective terms in the above-described equation (4) are identical to those of the equation (1).

It should also be noted that a template matching operation implies such a process operation that with respect to all of cutable partial images, evaluation values are calculated based upon the previously-explained predetermined evaluation formula so as to seek such a partial area which resembles a template in the highest degree. Then, in the template matching operation, if the evaluation is performed by employing either "correlation" or "sum of products" as the evaluation formula, then a partial area having the highest evaluation value is selected from the evaluation results, whereas if the evaluation is performed by employing either "sum of squares as to difference" or "sum of squares as to difference from average" as the evaluation formula, then a partial area having the lowest evaluation value is selected from the evaluation results, so that the selected partial area is found out as such a partial area which resembles the template in the highest degree.

Then, in accordance with the present invention, the evaluation values with respect to all of the partial images are calculated by executing the process operation in the step 305; the partial area which resembles the template is found out based upon the evaluation values in the process operation of the step 306; and a judgement is made as to whether or not a defect is present based upon this evaluation value.

Next, a detailed description is made of two concrete examples as to the below-mentioned process operation for forming the template 104 equipped with the defect pattern 103 based upon an equation (5) and another equation (6) among the above-described entire process sequences of the present invention: That is, in the process operation of the step 303 shown in FIG. 3, the defect pattern 103 where the defect may be readily produced is superimposed on the inspection portion 102 where the defect may easily occur so as to form the template 104 equipped with the defect pattern 103.

An addition of an image for superimposing the defect pattern 103 on the inspection portion 102 may be realized by executing a simple addition based upon the below-mentioned equation (5).

$$C(i,j)=A(i,j)+B(i,j) \quad (5)$$

In the equation (5), symbol "$A(i,j)$" implies a luminance value of a pixel located in an "i" row and a "j" column of the inspection portion 102;

symbol "$B(i,j)$" implies a luminance value of a pixel located in an "i" row and a "j" column of the defect pattern 103 where the defect may be easily produced;

symbol "$C(i,j)$" implies a pixel value obtained by performing the simple addition; and symbol "$(i,j)$" implies a position as to a pixel of interest within an image.

An adding process operation between images may be carried out by performing the above-described adding process operation indicated in the equation (5) at positions of all of pixels within the images. This addition corresponds to a simple adding process operation between the images with each other. Also, the addition of the images may also be carried out by executing a weighting addition defined by the below-mentioned equation (6).

$$C(i,j)=A(i,j)+\alpha \cdot B(i,j) \quad (6)$$

In the equation (6), symbol "$\alpha$" indicates a weighting factor; and such a case that the weighting factor $\alpha=1$ corresponds to the simple addition of the equation (5).

Figure 5:
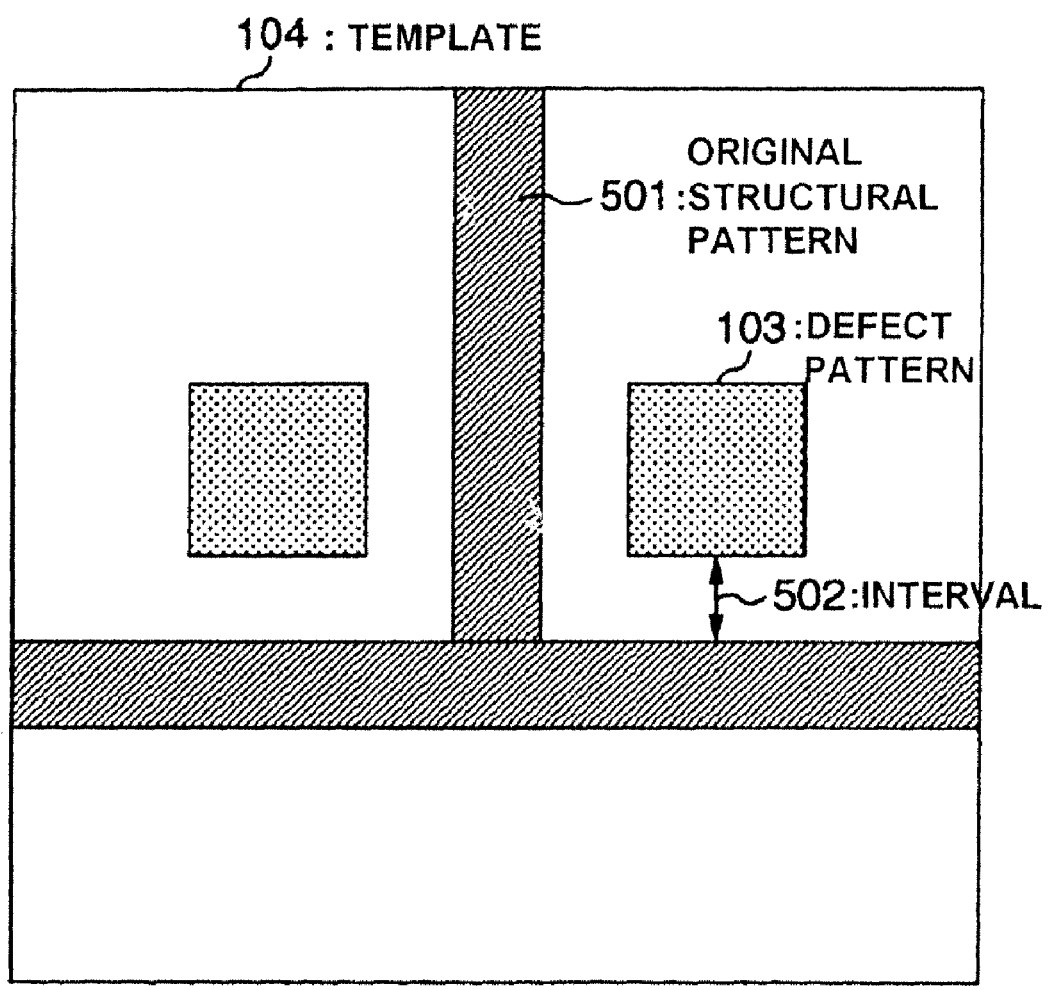
FIG. 5 is a diagram for showing a template equipped with a defect pattern on which a defect pattern where a defect may readily occur has been superimposed.

FIG. 5 is a diagram for representing the template 104 equipped with the defect pattern 103 formed in the process operation of the step 303 of FIG. 3, in which the defect pattern 103 where the defect may be readily produced has been superimposed on the inspection portion 102. The template 104 equipped with the defect pattern 103 is obtained as a result when the above-explained process operation based upon the equation (5), or the equation (6).

As shown in FIG. 5, in the template 104 equipped with the defect pattern 103, there are the defect pattern 103 and an original structural pattern 501. An interval 502 between the original structural pattern 501 and the defect pattern 103 may be adjusted by adjusting a position and a dimension of the defect pattern 103. When the interval 502 is made excessively narrow, even such a product which is entered in a manufacturing error of the original structural pattern 501 and is not recognized as a defective unit is regarded as the defective unit, and thus, it is so judged that a defect is present. Also, when the interval 502 is made excessively wide, even such a product is a defective unit, and thus, it is so judged that a defect is not present. As a consequence, the interval 502 is properly designated with respect to each of subjects to be inspected, while considering a balance of these aspects.

As previously described, the maximum feature of the present invention is to form the template 104 equipped with the defect pattern 103. In accordance with the present invention, while the template 104 equipped with the defect pattern 103 is employed as the template, such a template matching operation is carried out which is described in the above-explained publication entitled "Basic and Application Ideas of Digital Image Processing Operation based upon Visual C#. NET & Visual Basic. NET-from Basic Concept up to Face Image Recognition" written by Koich SAKAI, published by CQ publisher, first edition published on Sep. 1, 2003." As the evaluation formula of the matching operation, a proper evaluation formula may be selected in response to a nature of an image such as "correlation" and "sum of products." In accordance with the present invention, the below-mentioned advantage may be achieved. That is, since the template 104 equipped with the defect pattern 103 is employed as the template, if the defect is present, then the resemblance degree is increased. As a result, it is possible to judge whether or not the defect is present, depending upon such a condition as to whether or not the evaluation value is present in the direction for regarding that the resemblance degree is higher than the predetermined value.

Next, a description is made of a template matching apparatus according to a second embodiment of the present invention. It should be understood that an entire system arrangement and an arrangement of a computing apparatus employed in the template matching apparatus of the second embodiment are identical to those of the first embodiment shown in FIG. 2. Then, the second embodiment has the below-mentioned different point from the first embodiment: That is, instead of the manufacturing desirable image forming process unit 214, a processing unit for photographing a sample of a product so as to form a sample image is stored in the main memory 213 of the computing apparatus 204.

Figure 6:
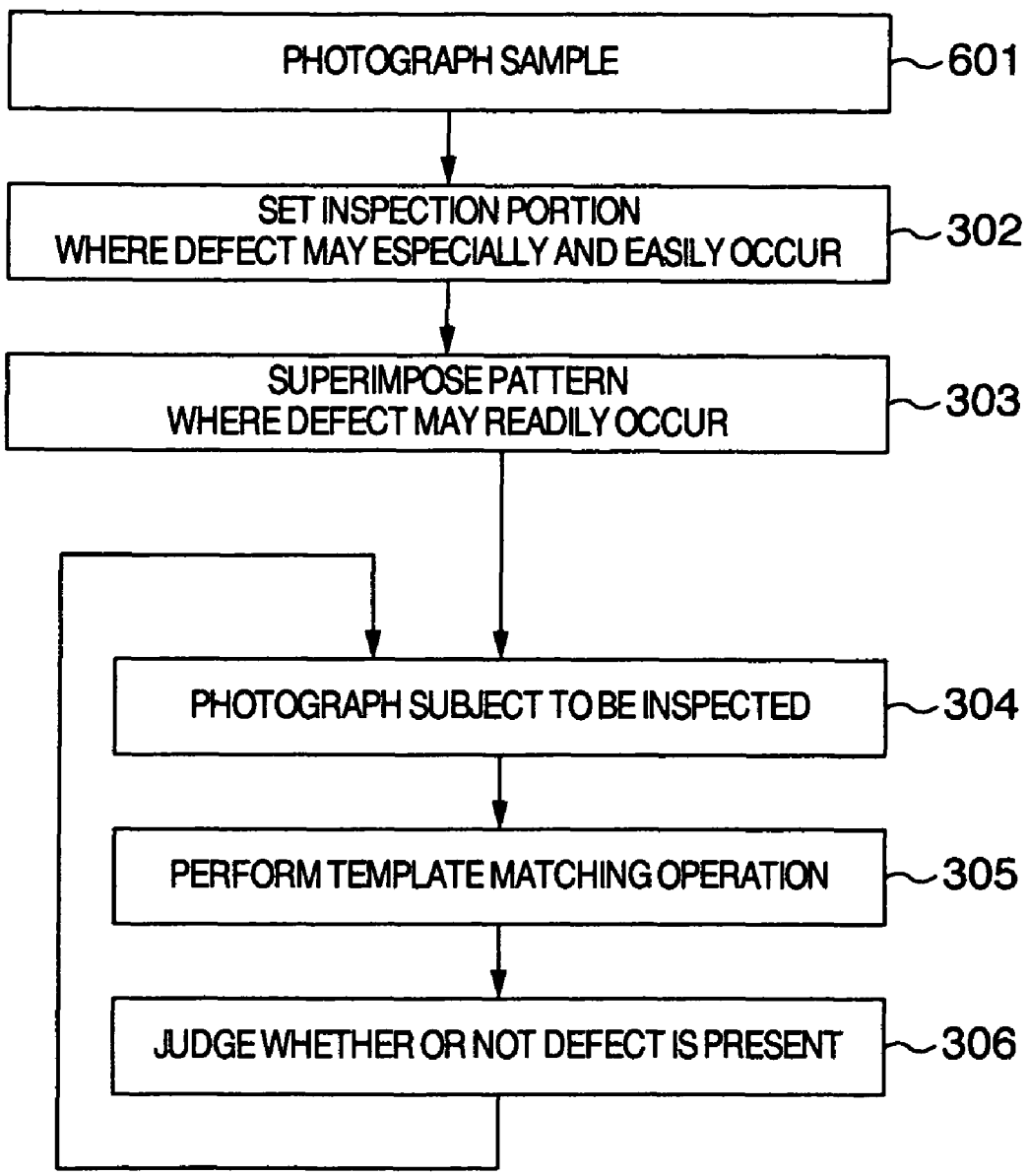
FIG. 6 is a flow chart for explaining an entire processing operation of a defect inspection apparatus according to a second embodiment mode of the present invention.

FIG. 6 is a flow chart for describing an entire processing operation of a defect inspection apparatus according to the second embodiment of the present invention, which will be subsequently explained. With respect to process operations performed in the second embodiment of the present invention represented in FIG. 6, a process operation for photographing a sample defined in a step 601 is newly executed instead of the step 301 explained in the first embodiment of the present invention shown in FIG. 3, and other process operations of the second embodiment are similar to those of the first embodiment. Referring now to the flow chart shown in FIG. 6, a description is made of a different process operation executed in the second embodiment of the present invention from that of the first embodiment.

In the second embodiment, in the process operation of the step 601, firstly, a sample of a product having no defect is photographed before a series of same products are inspected. As a photographic condition, magnification and the like are set to the same conditions in order that such an image having the same reduction scale as that when a subject to be inspected is photographed in the subsequent step 304 can be obtained. Although a similar process operation to that of the first embodiment is carried out as to the process operation in the step 302, there is such a different point that an image to be referred is not the manufacturing desirable image 101, but corresponds to the image obtained by photographing the sample. The process operations of the step 303 to the step 306 subsequent to the process operation of the step 302 are performed in a similar manner to those of the first embodiment.

As previously described, in the defect inspection apparatus according to the second embodiment of the present invention, there is only such a different point that the sample-photographed image is employed instead of the manufacturing desirable image 101, but other process operations of the second embodiment are identical to those of the first embodiment.

In accordance with the above-described first embodiment of the present invention, in the process operation defined in the step 301, the original image of the manufacturing desirable image 101 formed when the manufacture of the inspection subject 202 was designed is acquired; and the geometric transformation is carried out with respect to the acquired image so as to form the manufacturing desirable image 101. Alternatively, in accordance with the present invention, design data when the manufacture of the inspection subject 202 was designed may be acquired, and then, a process operation may be carried out with respect to the acquired design data, which is similar to the process operation when the manufacture of the inspection subject 202 was designed, in order to form the manufacturing desirable image 101.

Furthermore, in accordance with the present invention, in addition to the above-described alternative process operations, the below-mentioned process operations may be alternatively carried out. That is, when the manufacture of the inspection subject 202 is designed, not only the original image of the manufacturing desirable image 101 is formed, but also a portion where a defect may easily occur is designated. Then, the defect pattern 103 is superimposed on this designated portion so as to form an original image of a predicted image when the defect occurs; a scale during inspection is also designed during the design work; a predicted image when the defect occurs is formed in correspondence with the scale during the photographing operation; and while this predicted image is employed as the template 104 equipped with the defect pattern 103, the predicted image is transferred to the computing apparatus 204. As a result, the process operations executed in the step 301 and the step 302 may be no longer performed in the computing apparatus 204.

As previously described, while there are many embodiments of the present invention, advantages of the present invention can be achieved as follows: That is, while the template 104 equipped with the defect pattern 103 is employed as the template, which is formed by superimposing the defect pattern 103 to the template, the template matching operation is carried out. As a result, the judgement whether or not the defect is present can be carried out at a time with reference to the evaluation values of the respective partial images acquired by executing the template matching operations.

There are some possibilities that the present invention can be utilized in industrial fields of inspection apparatuses for acquiring images so as to inspect whether or not defects are present. For instance, the present invention may be applied to, for example, defect inspections of circuit patterns, abnormal shape inspections as to red blood cells of blood, and the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A defect inspection apparatus for inspecting whether or not a product has defects, comprising:
   a manufacturing desirable image forming circuit for forming a manufacturing desirable image from an original image, the original image being formed for manufacturing the product, the manufacturing desirable image being an modified image of the original image which is suitable to be compared with an image of the product for inspection;
   an inspection portion setting circuit for setting an inspection portion, where a defect may occur due to a manufacturing process of the product, within the manufacturing desirable image;
   a pattern superimposing circuit for superimposing a defect pattern on the inspection portion of the manufacturing desirable image so as to form a template image including the defect pattern;
   a photographing circuit for photographing the product to obtain the image of the product;
   a template matching circuit for comparing the image of the product with the template image including the defect pattern; and
   a defect present/absent judging circuit for judging whether or not the defect is present based upon an evaluation value outputted from the template matching circuit.

2. A defect inspection method for a defect inspecting apparatus for inspecting whether or not a product has defects, the defect inspecting apparatus comprising: a manufacturing image forming circuit; an inspection portion setting circuit; a pattern superimposing forming circuit; a photographing circuit; a template matching circuit; and a defect present/absent judging circuit, the method comprising
   forming, by the manufacturing desirable image forming circuit, a manufacturing desirable image from an original image, the original image being formed for manufacturing the product, the manufacturing desirable image being an modified image of the original image which is suitable to be compared with an image of the product for inspection;
   setting, by the inspection portion setting circuit an inspection portion, where a defect may occurs due to a manufacturing process of the product, within the manufacturing desirable image;
   superimposing, by the pattern superimposing circuit, a defect pattern on the inspection portion of the manufacturing desirable image so as to form a template image including the defect pattern;
   photographing, by the photographing circuit, the product to obtain the image of the product;

comparing, by the template matching circuit, the image of the product with the template image including the defect pattern; and judging, by the defect present/absent judging circuit, whether or not the defect is present based upon an evaluation value outputted from the template matching circuit.

3. A non-transitory tangible computer readable storage medium encoded with a defect inspection program for inspecting whether or not a product has defects, the program, when executed by a computer, causing the computer to perform the steps of:

forming a manufacturing desirable image from an original image, the original image being formed for manufacturing the product, the manufacturing desirable image being an modified image of the original image which is suitable to be compared with an image of the product for inspection;

for setting an inspection portion, where a defect may occur due to a manufacturing process of the product, within the manufacturing desirable image;

superimposing a defect pattern on the inspection portion of the manufacturing desirable image so as to form a template image including the defect pattern;

photographing the product to obtain the image of the product;

comparing the image of the product with the template image including the defect pattern; and judging whether or not the defect is present based upon an evaluation value outputted from the template matching circuit.

* * * * *